(12) United States Patent
Kang et al.

(10) Patent No.: US 11,181,742 B2
(45) Date of Patent: Nov. 23, 2021

(54) DISPLAY PANEL, AND 3D DISPLAY DEVICE AND 3D HEAD UP DISPLAY (HUD) DEVICE USING THE DISPLAY PANEL

(71) Applicant: SAMSUNG ELECTRONICS CO., LTD., Suwon-si (KR)

(72) Inventors: Byong Min Kang, Yongin-si (KR); Yoonsun Choi, Yongin-si (KR); Dong Kyung Nam, Yongin-si (KR); Juyong Park, Seongnam-si (KR); Jinho Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/567,691

(22) Filed: Sep. 11, 2019

(65) Prior Publication Data

US 2020/0110266 A1    Apr. 9, 2020

Related U.S. Application Data

(60) Provisional application No. 62/741,887, filed on Oct. 5, 2018.

(30) Foreign Application Priority Data

Jan. 29, 2019    (KR) ........................ 10-2019-0011177

(51) Int. Cl.
*G02F 1/1339*    (2006.01)
*G02B 27/01*    (2006.01)
(Continued)

(52) U.S. Cl.
CPC ......... *G02B 27/0172* (2013.01); *G02B 30/27* (2020.01); *G02F 1/1339* (2013.01); *H04N 13/305* (2018.05); *G02B 2027/014* (2013.01)

(58) Field of Classification Search
CPC .................................................... G02F 1/1339
See application file for complete search history.

(56) References Cited

U.S. PATENT DOCUMENTS 5,519,794 A    5/1996    Sandor et al.
6,614,552 B2    9/2003    Davies et al.
(Continued)

FOREIGN PATENT DOCUMENTS

JP    2016-139112 A    8/2016
JP    2016-142726 A    8/2016
(Continued)

OTHER PUBLICATIONS

Communication dated Mar. 10, 2020 issued by the European Patent Office in counterpart European Patent Application No. 19201517.0.
(Continued)

*Primary Examiner* — Edmond C Lau
(74) *Attorney, Agent, or Firm* — Sughrue Mion, PLLC

(57) ABSTRACT

Provided are a display panel and a three-dimensional (3D) display device and a 3D head-up display (HUD) device using the display panel. The display panel includes a plurality of pixels, and a plurality of placement spaces provided between the plurality of pixels, wherein the plurality of pixels are uniformly provided in the display panel based on a pattern corresponding to the plurality of placement spaces, and wherein a frequency corresponding to a repetition interval of the pattern is outside of a cognitive frequency band that is visible to a user.

23 Claims, 7 Drawing Sheets

(51) Int. Cl.
*H04N 13/305* (2018.01)
*G02B 30/27* (2020.01)

(56) References Cited

U.S. PATENT DOCUMENTS

| | | | |
|---|---|---|---|
| 7,965,447 | B2 | 6/2011 | Olczak |
| 8,953,241 | B2 | 2/2015 | Song |
| 2002/0185963 | A1* | 12/2002 | Browning ............... H01J 9/242 |
| | | | 313/495 |
| 2005/0270444 | A1 | 12/2005 | Miller et al. |
| 2015/0293394 | A1* | 10/2015 | Chung ............... G02F 1/133784 |
| | | | 349/110 |
| 2016/0044302 | A1 | 2/2016 | Fang et al. |
| 2017/0017086 | A1 | 1/2017 | Wei |
| 2017/0070727 | A1* | 3/2017 | Chen ..................... G02B 3/0031 |
| 2020/0174279 | A1* | 6/2020 | Ishihara ............... H04N 13/324 |

FOREIGN PATENT DOCUMENTS

| | | |
|---|---|---|
| KR | 10-0538227 B1 | 12/2005 |
| KR | 10-0662630 B1 | 1/2007 |
| KR | 10-0725538 B1 | 6/2007 |
| KR | 10-1441583 B1 | 9/2014 |
| KR | 10-2016-0110876 A | 9/2016 |
| KR | 10-1728821 B1 | 5/2017 |

OTHER PUBLICATIONS

Takaki, Y., et al., "Flat panel display with slanted pixel arrangement for 16-view display", Proceedings of SPIE, vol. 7237, Jan. 1, 2009, XP055035265, 8 pages.

Chou et al., "Using Moiré Chroma for DSC On-line Focus Calibration", IS&T's 2003 PICS Conference, 2003, pp. 447-450, 4 pages total.

Ko et al., "A Robust Method for Automatic Generation of Moire Reference Phase from Noisy Image", vol. 10, No. 5, 2009, pp. 909-916, 8 pages total.

\* cited by examiner

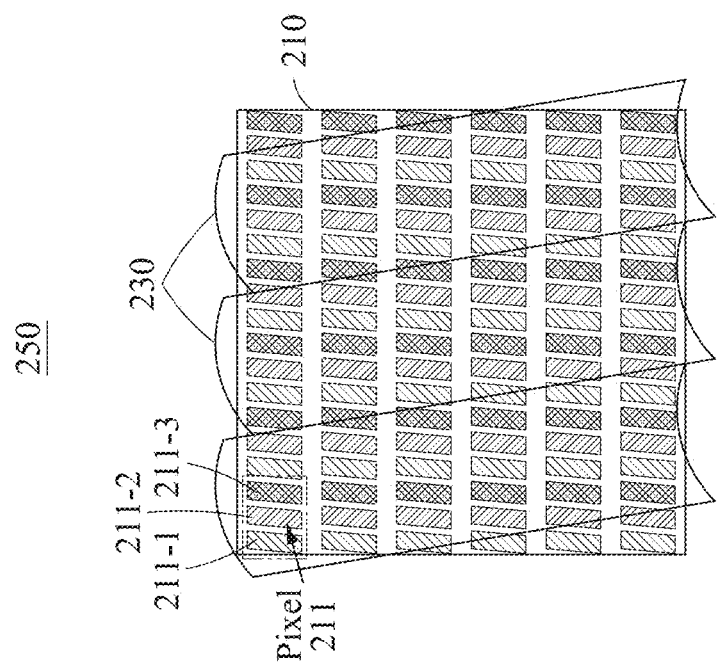
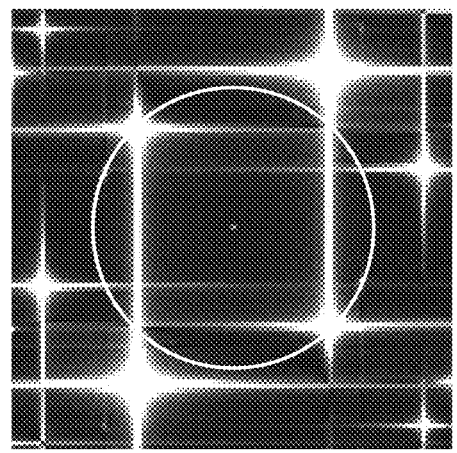
FIG. 2A
FIG. 2B

DISPLAY PANEL, AND 3D DISPLAY DEVICE AND 3D HEAD UP DISPLAY (HUD) DEVICE USING THE DISPLAY PANEL

CROSS-REFERENCE TO RELATED APPLICATION

This application claims benefit of U.S. Provisional Application No. 62/741,887 filed on Oct. 5, 2018 in the U.S. Patent and Trademark Office, and claims the priority from Korean Patent Application No. 10-2019-0011177 filed on Jan. 29, 2019 in the Korean Intellectual Property Office, the disclosures of which are incorporated herein by reference in their entireties.

BACKGROUND

1. Field

Example embodiments of the present disclosure relate to a display panel and a three-dimensional (3D) display device and a 3D head-up display (HUD) device using the display panel.

2. Description of the Related Art

When two patterns that repeat at desired intervals overlap, a pattern having a new repetition interval may be generated due to interference between the patterns. Such the pattern is referred to as moiré. In general, a 3D display may be manufactured by displacing a lens on a display panel. The moiré may occur due to pixels uniformly provided on the display panel and lens uniformly provided thereon. The moiré may cause a degradation in quality of a 3D image. In particular, a striped pattern by moiré occurring when the display panel is applied to a 3D HUD may interrupt driving.

SUMMARY

One or more example embodiments may address at least the above problems and/or disadvantages and other disadvantages not described above. Also, the example embodiments are not required to overcome the disadvantages described above, and an example embodiment may not overcome any of the problems described above.

According to an aspect of an example embodiment, there is provided a display panel including a plurality of pixels, and a plurality of placement spaces provided between the plurality of pixels, wherein the plurality of pixels are uniformly provided in the display panel based on a pattern corresponding to the plurality of placement spaces, and wherein a frequency corresponding to a repetition interval of the pattern is outside of a cognitive frequency band that is visible to a user.

The pattern may include at least one pixel, and wherein a structure of subpixels included in the at least one pixel may be determined based on each of a plurality of placement spaces in the display panel.

Each of the plurality of pixels may have a same shape.

The shape of each of the plurality of pixels may be determined based on a pattern by a combination of a plurality of subpixels included in each of the plurality of pixels, and each of the plurality of pixels may have a same pattern in the display panel.

A structure of subpixels included in the each of the plurality of pixels may be determined based on each of the plurality of placement spaces that may include a spacer.

At least one of the subpixels included in each of the plurality of pixels may have a size that is different from sizes of remaining subpixels included in each of the plurality of pixels to correspond to each of the plurality of placement spaces.

A structure of subpixels included in each of the plurality of pixels may be determined based on a combination of shapes, sizes, and gradients of the subpixels.

The repetition interval of the pattern may include at least one of a first interval at which the pattern is repeated in a horizontal direction, a second interval at which the pattern is repeated in a vertical direction, and a third interval at which the pattern is repeated in a direction corresponding to a combination of the horizontal direction and the vertical direction.

The plurality of pixels may include liquid crystals.

According to another aspect of an example embodiment, there is provided a third-dimensional (3D) display device including a display panel including a plurality of pixels and a plurality of placement spaces provided between the plurality of pixels, and an optical layer configured to control a direction of light incident from the display panel, wherein the plurality of pixels are uniformly provided in the display panel based on a pattern corresponding to the plurality of placement spaces, and wherein a frequency corresponding to a repetition interval of the pattern is outside of a cognitive frequency band that is visible to a user.

The pattern may include at least one pixel, and wherein a structure of subpixels included in the at least one pixel is determined based on each of a plurality of placement spaces in the display panel.

Each of the plurality of pixels may have a same shape.

The shape of each of the plurality of pixels may be determined based on a pattern by a combination of a plurality of subpixels included in each of the plurality of pixels, and each of the plurality of pixels has a same pattern in the display panel.

A structure of subpixels included in each of the plurality of pixels may be determined based on each of the plurality of placement spaces that may include a spacer.

At least one of the subpixels included in each of the plurality of pixels may have a size that is different from sizes of remaining subpixels included in each of the plurality of pixels to correspond to each of the plurality of placement spaces.

A structure of subpixels included in each of the plurality of pixels may be determined based on a combination of shapes, sizes, and gradients of the subpixels.

The repetition interval of the pattern may include at least one of a first interval at which the pattern is repeated in a horizontal direction, a second interval at which the pattern is repeated in a vertical direction, and a third interval at which the pattern is repeated in a direction corresponding to a combination of the horizontal direction and the vertical direction.

According to another aspect of an example embodiment, there is provided a three-dimensional (3D) head-up display (HUD) device including a display panel including a plurality of pixels and a plurality of a placement spaces provided between the plurality of pixels, and an optical layer included in a windshield of a vehicle and configured to control a direction of light incident from the display panel, and at least one processor configured to generate a panel image that is displayed on the display panel based on positions of both eyes of a user to provide a 3D image to the user through the optical layer, wherein the plurality of pixels are uniformly provided in the display panel based on a pattern corresponding to the plurality of placement spaces, and a frequency corresponding to a repetition interval of the pattern is outside of a cognitive frequency band that is visible to the user.

The pattern may include at least one pixel, and wherein a structure of subpixels included in the at least one pixel may be determined based on each of a plurality of placement spaces in the display panel.

A structure of subpixels included in each of the plurality of pixels may be determined based on each of the plurality of placement spaces that include a spacer.

At least a portion of the subpixels included in each of the plurality of pixels may have a size that is different from sizes of remaining subpixels included in each of the plurality of pixels to correspond to each of the plurality of placement spaces.

A structure of subpixels included in each of the plurality of pixels may be determined based on a combination of shapes, sizes, and gradients of the subpixels.

The repetition interval of the pattern may include at least one of a first interval at which the pattern is repeated in a horizontal direction, a second interval at which the pattern is repeated in a vertical direction, and a third interval at which the pattern is repeated in a direction corresponding to a combination of the horizontal direction and the vertical direction.

According to an aspect of an example embodiment, there is provided a display panel including a plurality of pixels, a plurality of subpixels included in each of the plurality of pixels, a plurality placement spaces provided between the plurality of pixels, wherein the plurality of pixels are uniformly provided in the display panel based on a pattern of the plurality of subpixels corresponding to the plurality of placement spaces, and wherein a frequency corresponding to a repetition interval of the pattern is outside of a cognitive frequency band that is visible to a user.

The plurality of subpixels may include at least a red sub-pixel, a green sub-pixel, and a blue sub-pixel, and a size, a shape, and a gradient of the red sub-pixel, the green sub-pixel, and the blue sub-pixel included in each of the plurality of pixels are same, respectively.

At least one of the red sub-pixel, the green sub-pixel, and the blue sub-pixel included in each of the plurality of pixels may have a size that is different from remaining subpixels included in each of the plurality of pixels based on each of the placement spaces.

Each of the plurality of placement spaces include a spacer.

BRIEF DESCRIPTION OF THE DRAWINGS

The above and/or other aspects will be more apparent by describing example embodiments with reference to the accompanying drawings, in which:

FIGS. 2A and 2B illustrate a pixel structure of a single domain display panel and a frequency image corresponding to the pixel structure according to an example embodiment;

DETAILED DESCRIPTION

Figure 1A:
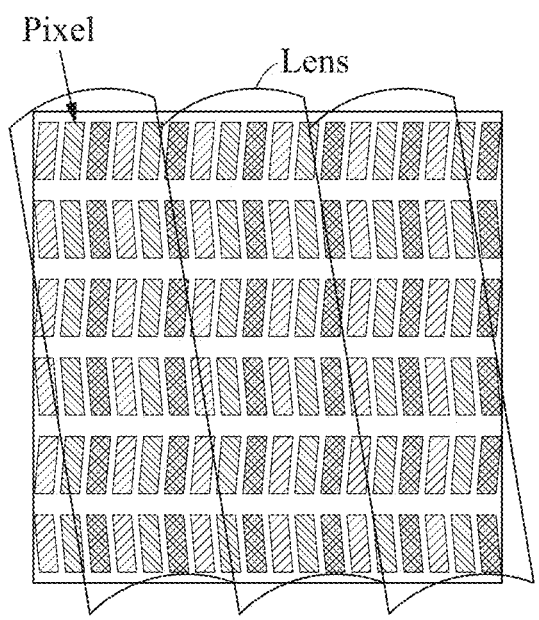
FIGS. 1A, 1B, and 1C illustrate moiré occurring on a display panel in a pixel structure of a general dual domain display.

Reference will now be made in detail to example embodiments, examples of which are illustrated in the accompanying drawings, wherein like reference numerals refer to the like elements throughout. Example embodiments are described below in order to explain the disclosure by referring to the figures.

The following structural or functional descriptions are example to describe the example embodiments, and the scope of the example embodiments is not limited to the descriptions provided in the present specification. Various changes and modifications can be made thereto by those of ordinary skill in the art.

Although terms of "first" or "second" are used to explain various components, the components are not limited to the terms. These terms may be used only to distinguish one component from another component. For example, a "first" component may be referred to as a "second" component, or similarly, and the "second" component may be referred to as the "first" component within the scope of the right according to the concept of the disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise. The terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Unless otherwise defined herein, all terms used herein including technical or scientific terms have the same meanings as those generally understood by one of ordinary skill in the art. Terms defined in dictionaries generally used may be construed to have meanings matching with contextual meanings in the related art and are not to be construed as an ideal or excessively formal meaning unless otherwise defined herein.

The following example embodiments may be applied to recognize a user, to display a line in an augmented reality (AR) system, such as a smart vehicle, or to generate visual information for assisting steering of an autonomous driving vehicle. Also, the example embodiments may be applied to track visual information and assist safe and pleasant driving in a device that includes a smart system, such as a head-up display (HUD) installed for driving assistance or complete autonomous driving of a vehicle. The example embodiments may be applied to, for example, a smartphone, a mobile device, a navigation device, an autonomous driving vehicle, and a smart vehicle.

Figure 1B:
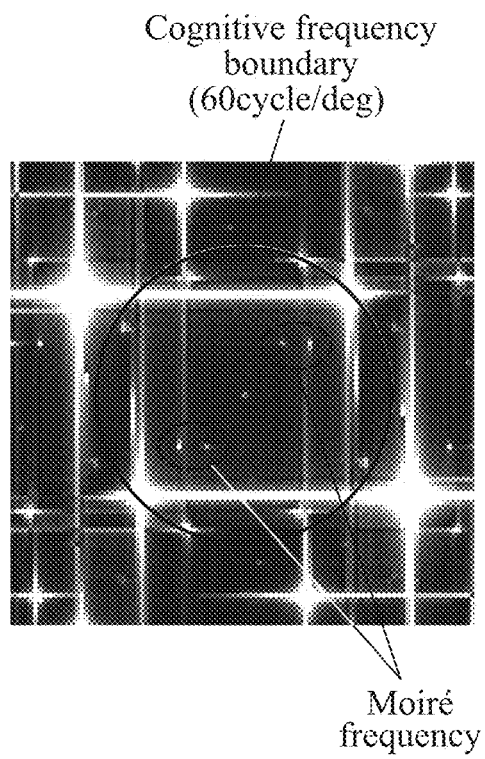
Figure 1C:
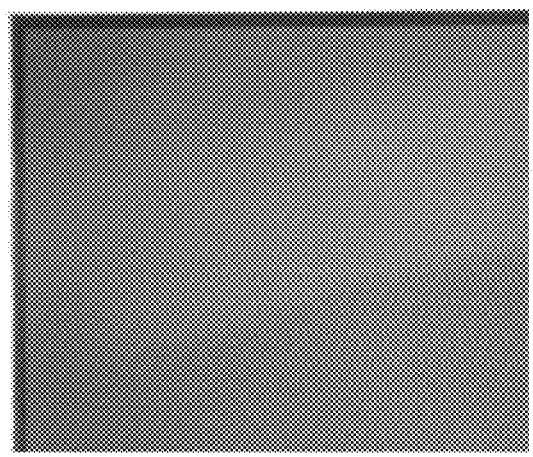

FIG. 1 illustrate examples of moiré occurring on a display panel in a pixel structure of a general dual domain display. In detail, FIG. 1A illustrates an example of a pixel structure of a dual domain display, FIG. 1B illustrates an example of a frequency image in the pixel structure of FIG. 1A, and FIG. 1C illustrates an example of moiré occurring in response to manufacturing a 3D display in the pixel structure of FIG. 1A.

Referring to FIG. 1A, the 3D display device may be manufactured by overlapping lenses on a display panel that includes pixels. Here, interference may occur due to the pixels and the lenses that are uniformly placed on the display panel. That is, interference may occur due to the lenses that are uniformly placed on a single display panel on which the pixels are uniformly placed. When a frequency of moiré occurring due to the interference is in a low frequency domain, a user may recognize the moiré as a stripe. In general, eyes of a human may not recognize a pattern with a frequency of greater than or equal to 60 cycle/degree and may recognize a pattern with a frequency of less than 60 cycle/degree. The frequency of less than 60 cycle/degree may correspond to a cognitive frequency band or a visibility circle. Referring to FIG. 1B, a portion indicated with a circle with a solid line represents a boundary of a frequency of 60 cycle/degree and may be referred to as a cognitive frequency boundary. Here, a frequency included in the cognitive frequency boundary, that is, the frequency of less than 60 cycle/degree may be a cognitive frequency of a moiré frequency. For a periodic interference pattern occurring due to moiré in a moiré frequency may be recognized at eyes of the user as moiré as shown in FIG. 1C. Moiré is a factor that degrades quality of a 3D image and needs to be reduced or removed.

In general, a cause for moiré may be more easily analyzed in a frequency domain rather than in a space domain. Therefore, presence or absence of moiré may be verified from an image transformed to the frequency domain. Also, although moiré generally defines a periodic pattern that is newly generated regardless of whether it is visible to eyes of the user, a periodic pattern that is viewed by eyes of the user may be moiré for clarity of description. The term periodic pattern may be a pattern that is repeated at a desired interval.

In the dual domain display of FIG. 1A, odd rows of pixels are tilted to the left and even rows of pixels are tilted to the right. A pixel structure in which a pattern of pixels of odd rows and a pattern of pixels of even rows are different may be a dual domain structure. In the dual domain structure, a pixel pattern repetition interval increases due to a difference between shapes of upper pixels and lower pixels compared to a single domain structure, and as a frequency is inversely proportional to the pattern repetition interval, a frequency may decrease and be generated in a low frequency domain accordingly. The overlap between a low frequency and a lenticular lens may increase a moiré occurrence probability.

In one example, it is possible to remove moiré from the cognitive frequency band by changing a period of moiré through a modification in the pixel structure to decrease the pixel pattern repetition interval. For example, the dual domain structure may be used to enhance a viewing angle of a display. However, a device having a relatively small viewing angle compared to a general display, such as a head-up display (HUD) device, the dual domain structure for enhancing the viewing angle may not be required. Accordingly, moiré may be removed from the cognitive frequency band by changing a pixel structure of a dual domain with a pixel structure of a single domain and thereby changing a period of moiré.

FIG. 2 illustrates examples of a pixel structure of a single domain display panel and a frequency image corresponding to the pixel structure according to an example embodiment. FIG. 2A illustrates an example of a 3D display device 250 configured to output light of pixels 211 in a specific direction by placing an optical layer 230 on a display panel 210. FIG. 2B illustrates an example of a frequency domain image when the optical layer 230 is attached on the display panel 210.

For example, the display panel 210 may be a single domain display panel on which even rows of pixels and odd rows of pixels are in the same pattern. Each of the pixels 211 may include a plurality of subpixels, for example, a red (R) subpixel 211-1, a green (G) subpixel 211-2, and a blue (B) subpixel 211-3. In the single domain display panel, all of the pixels 211 may have the same shape, the same size, and the same gradient. Referring to FIG. 2B, when the 3D display device 250 is manufactured using the single domain pixel structure, moiré does not occur in the cognitive frequency band.

The optical layer 230 may be a lenticular lens or a barrier having a periodical characteristic. For example, the optical layer 230 may be a lenticular lens in a vertically elongated shape as a semi-cylindrical lens. The optical layer 230 may control a direction of light incident from the display panel 210.

Figure 3A:
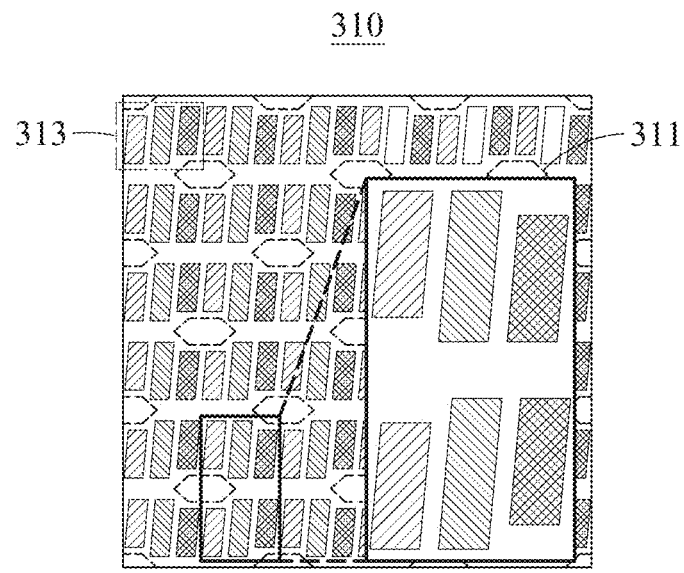
FIGS. 3A, 3B, and 3C illustrate a display panel including pixels in different patterns according to an example embodiment.
Figure 3B:
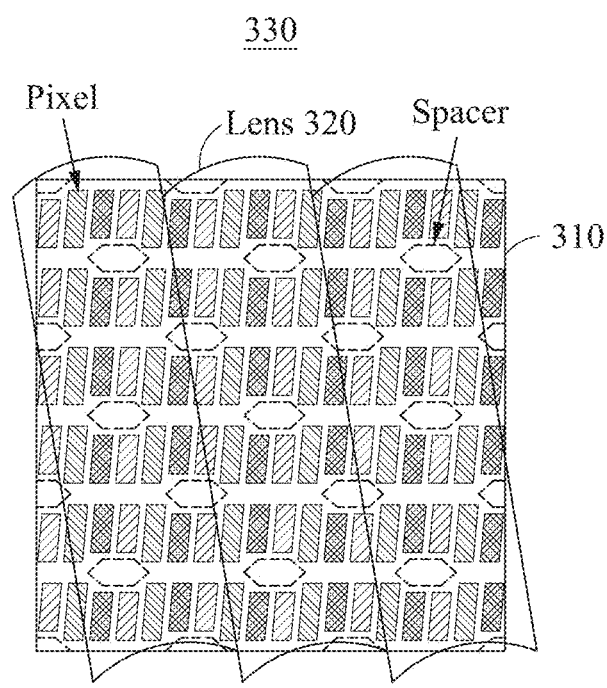
Figure 3C:
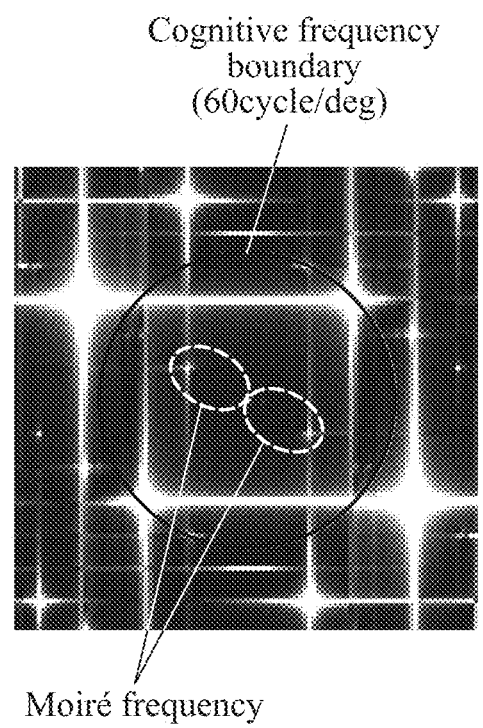

In general, to maintain a panel thickness, a spacer (see FIG. 3A) may be provided between the pixels 211. The spacer may be provided between the pixels 211 to support a load by difference between an internal pressure and an external pressure of the display panel 210. Shapes of some pixels 211 or some subpixels in the corresponding pixel 211 may vary due to the spacer. Due to different pixel shapes, a pixel pattern repetition interval may increase, which may cause moiré in the cognitive frequency band. Hereinafter, moiré occurring due to the spacer is described with reference to FIGS. 3A, 3B, and 3C and a method of removing moiré occurring due to the pixel structure of FIG. 3 is described with reference to FIGS. 4A, 4B, and 4C. As illustrated in FIG. 3A, the spacer may be present within the display panel 210.

FIG. 3A illustrates examples of describing a display panel including pixels in different patterns according to an example embodiment. In detail, FIG. 3A illustrates an example of a display panel 310 including spacers 311 and pixels 313. Shapes of the pixels 313 included in the display 310 may vary due to the spacers 311. For example, due the spacer 311, shapes of R, G, B subpixels included in the respective pixels 313 may differ from each other in an odd row and an even row. For example, a size of an R subpixel included in the pixel 313 of an odd row may be less than those of G and B subpixels. Also, a size of an R subpixel included in the pixel 313 of an even row may be less than those of B and G subpixels. As described above with reference to FIG. 1, in response to modifying a shape and/or a size of a pixel or a subpixel, a low frequency may be generated in a frequency domain and the generated low frequency may cause moiré in a cognitive frequency band.

Referring to FIG. 3B, a 3D display device 330 includes the display panel 310 and an optical layer 320. The display panel 310 may include a plurality of pixels 313 and a plurality of spacers 311 configured to maintain a space for the plurality of pixels 313.

FIG. 3C illustrates an example of moiré occurring in the cognitive frequency band when the 3D display device 330 is manufactured using the display panel 310 in the pixel structure of FIG. 3A. Such moiré occurring since a pixel shape varies due to the spacer 311 may be solved through a pixel structure of FIGS. 4A and 4B.

Figure 4A:
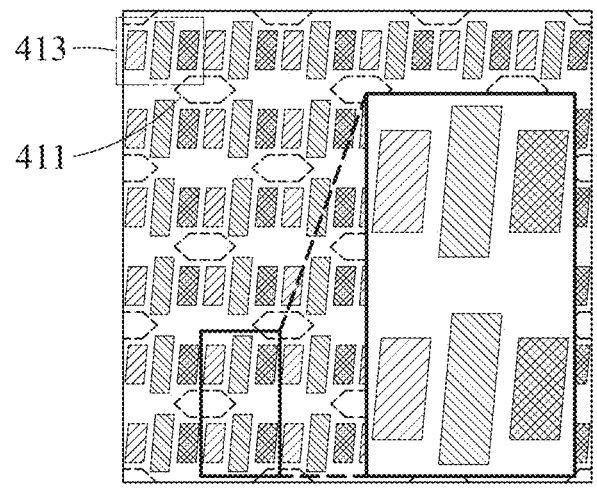
FIGS. 4A, 4B, and 4C illustrate a display panel including pixels in the same pattern according to an example embodiment.
Figure 4B:
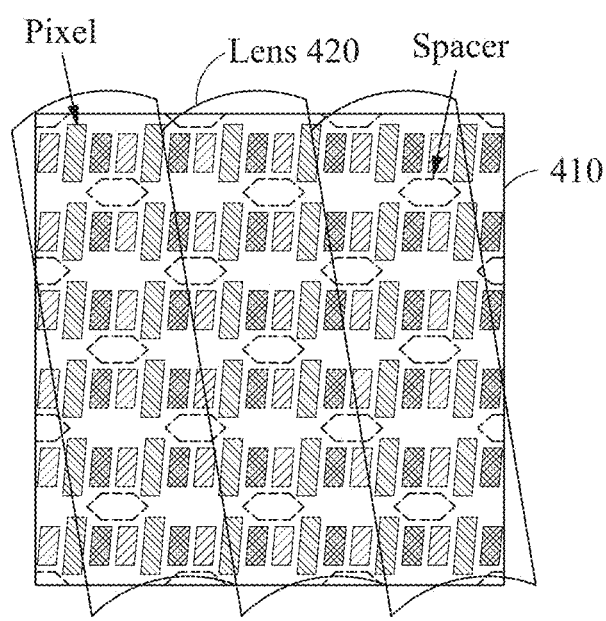

FIGS. 4A and 4B illustrate a display panel including pixels in the same pattern according to an example embodiment. For example, FIG. 4A illustrates an example of a display panel 410 including spacers 411 and pixels 413. Shapes of the pixels 413 included in the display panel 410 may vary due to the spacers 411.

According to an example embodiment, the pixels 413 are uniformly provided in the display panel 410 based on a pattern that is determined based on the spacers 411. Here, the pattern may be represented using shapes, sizes, and gradients of R, G, and B subpixels included in an individual pixel. For example, each of the pixels 413 may have the same shape, size, and gradient in an even row and an odd row of the display panel 410 based on the determined pattern. Here, the pattern may refer to a pattern in which R, G, and B subpixels included in an individual pixel are arranged in line, have the same gradient, and sizes of the R subpixel and the B subpixel being less than that of the G subpixel.

The pixels 413 may have the same shape. For example, shapes of the pixels 413 corresponding to a single pattern formed by R, G, and B subpixels may be identical to each other. Also, the shapes of the pixels 413 may be determined based on a pattern by a combination of a plurality of subpixels included in an individual pixel and each of the pixels 413 in the display panel 410 may have the same pattern. For example, the shapes, sizes, and gradients of the R, G, and B subpixels respectively included in each of the pixels 413 may be identical.

As illustrated in FIGS. 4A and 4B, when the repetition interval of a pattern is decreased, a frequency corresponding to a repetition interval of a pattern increases and may not be included in a cognitive frequency band of a user, for example, a cognitive frequency boundary of 60 cycle/degree. The repetition interval of the pattern may include at least one of a first interval at which the pattern is repeated in a horizontal direction, a second interval at which the pattern is repeated in a vertical direction, and a third interval at which the pattern is repeated in a direction corresponding to a combination of the horizontal direction and the vertical direction.

The pattern may include at least one pixel 413 and a structure of subpixels included in the pixel 413 may be determined based on a spacer placement space in the display panel 410. In particular, a structure of the subpixels included in the pattern may be determined based on the spacer placement space that is maintained regardless of whether the spacer 411 is actually provided. For example, the structure of the subpixels 413 included in the pattern may be in a structure where a spacer placement space is empty at an upper end and/or lower end of an R subpixel and at an upper end and/or lower end of a B subpixel in which the spacer 411 may be placed, regardless of whether the spacer 411 is actually placed.

That is, at least one of the subpixels included in a pixel may have a size different from that of remaining pixels included in the pixel to secure the placement space. For example, a pixel may include an R subpixel with a first size, a G subpixel with a second size greater than the first size, and a B subpixel with the first size. According to an example embodiment, the pixel may include the R subpixel with the first size, the G subpixel with the second size less than the first size, and the B subpixel with a third size less than the first size and greater than the second size.

For example, the placement space of the spacer 411 may be prepared to be adjacent to the R subpixel and the B subpixel. In addition, the structure of subpixels included in the pattern may be determined based on various combinations of shapes, sizes, and gradients of subpixels.

According to an example embodiment, a pixel repetition interval may be reduced by adjusting a size of a subpixel in an area in which the spacer 411 is not actually placed. As described above, as the pixel repetition interval decreases the frequency increases, and thus moiré may be removed from the cognitive frequency band.

FIG. 4A illustrates an example in which the pixels 413 of the display panel 410 are in the same shape. FIG. 3A illustrates an example in which the pixels 313 of the display panel 310 are in different shapes. Here, an additional frequency component may be generated or present in addition to a pixel repetition interval based on an interval at which a new pattern is repeated due to the pixels in the different shape. Here, the new pattern may be, for example, a pattern configured based on a unit of n×m pixels where n and m denote positive integers and at least one of n and m is 2 or more. For example, when a lenticular lens is overlapped on a pixel structure having a new pattern, a new interference frequency may be generated in a frequency component due to the lenticular lens. Overlapping of the lenticular lens may represent a convolution effect in a frequency image. Accordingly, the simpler a frequency by a pixel repetition pattern becomes, the less an interference frequency is generated, which may decrease a probability that the interference frequency is included in the cognitive frequency band.

Referring to FIG. 4B, a 3D display device 430 includes the display panel 410 and an optical layer 420. The display panel 410 may include a plurality of pixels 413 and a plurality of spacers 411 configured to maintain a space for the plurality of pixels 413.

Figure 4C:
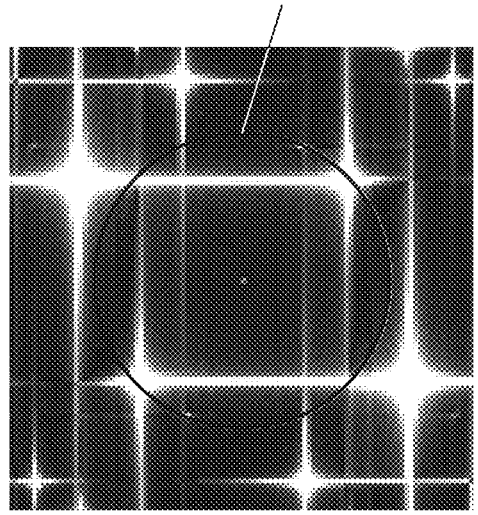

FIG. 4C illustrates an example of a frequency domain of the 3D display device 430 in the pixel structure of FIG. 4A. Referring to FIG. 4C, a moiré frequency is absent in the cognitive frequency band.

Figure 5:
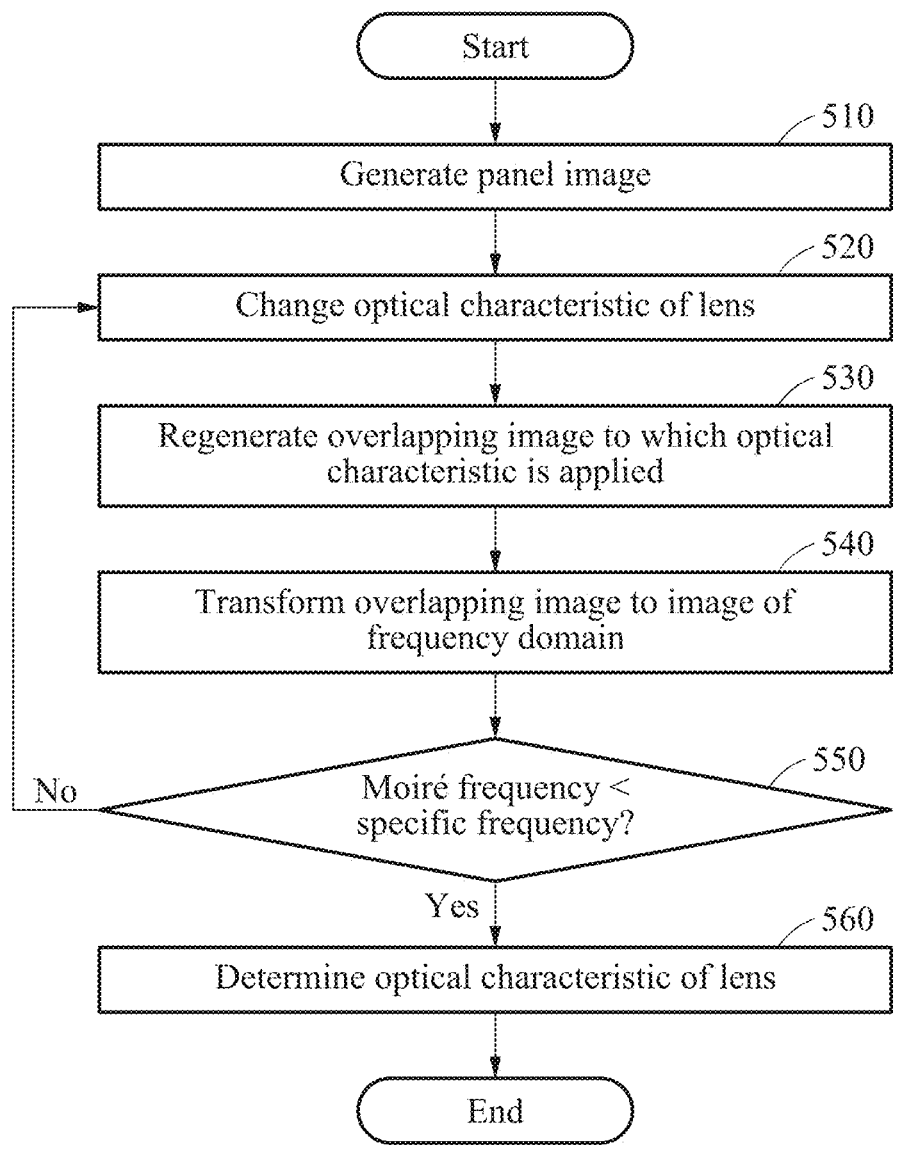
FIG. 5 is a flowchart illustrating a simulation method of a three-dimensional (3D) display device according to an example embodiment.

FIG. 5 is a flowchart illustrating an example of a simulation method of a 3D display device according to an example embodiment. A process of performing a simulation to prevent or reduce occurrence of moiré without directly attaching a lens using a simulation apparatus according to an example embodiment is described with reference to FIG. 5. Referring to FIG. 5, in operation 510, the simulation apparatus may generate a panel image to provide a 3D image to which an optical characteristic is applied. Here, the 3D image may include a left image and a right image as images that are provided to both eyes of a user, for example, a viewer. The 3D image may be an input image, for example, augmented reality (AR) content. The panel image may be an image represented on a display panel of the 3D display device and may be generated based on positions of eyes of the user and direction information of light to provide a 3D image to the user. For the simulation operation of FIG. 5, the simulation apparatus may generate a white image in which all of the pixels are ON as the panel image.

In operation 520, the simulation apparatus may change an optical characteristic, for example, a pitch and/or angle, of a lens of the 3D display device. In operation 530, the simulation apparatus may generate an overlapping image by applying the optical characteristic changed in operation 520. The overlapping image may be an image that is formed at both eyes of the user. For example, when the 3D image is provided from the 3D display device, the simulation apparatus may capture the overlapping image.

In operation 540, the simulation apparatus may transform the overlapping image to an image of a frequency domain. In operation 550, the simulation apparatus may determine whether a moiré frequency included in the image of the frequency domain is present within a cognitive frequency band. For example, when the moiré frequency included in the frequency domain image is less than a cognitive frequency boundary in operation 550, the simulation apparatus may again change the optical characteristic of the lens of the display panel in operation 520.

On the contrary, when moiré within the cognitive frequency band is determined to be absent in the image of the frequency domain in operation 550, the simulation apparatus may determine the corresponding optical characteristic as the optical characteristic of the lens in operation 560.

Figure 6:
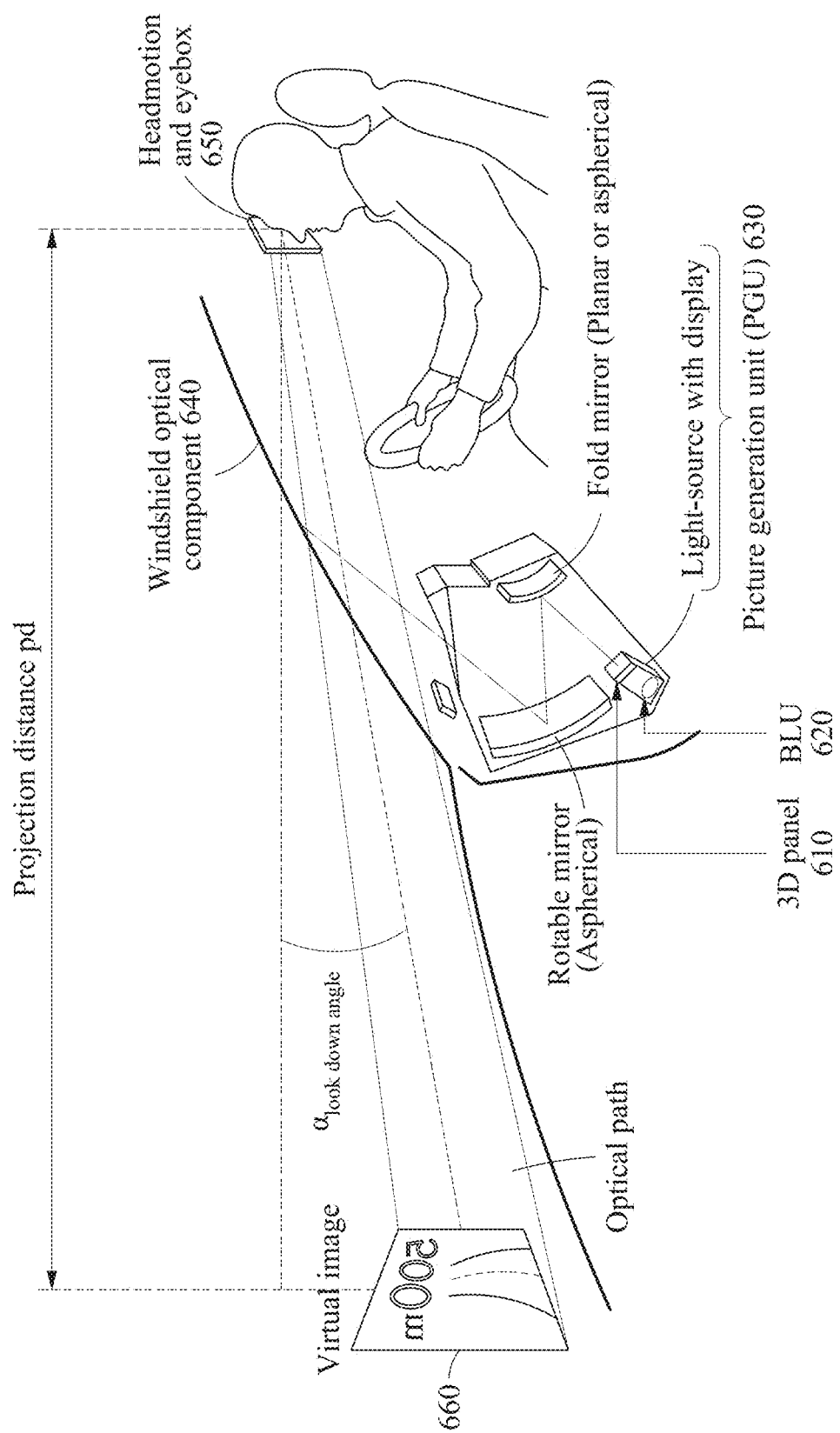
FIG. 6 illustrates a structure and an operation of a 3D head-up device (HUD) device according to an example embodiment.

FIG. 6 illustrates an example of describing a structure and an operation of a 3D HUD device according to an example embodiment. Referring to FIG. 6, a 3D HUD device 600 may include a display panel 610, a picture generation unit (PGU) 630 including a backlight unit (BLU) 620, and an optical layer 640.

The display panel 610 includes a plurality of pixels and a plurality of spacers configured to maintain a space for the plurality of spacers. The pixels are uniformly provided in the display panel 610 based on a pattern that is determined based on the plurality of spacers, and a frequency corresponding to a repetition interval of the pattern is not included in a cognitive frequency band of a user. The description made above with respect to the display panel 410 of FIG. 4 may be applicable to the display panel 610.

The BLU 620 may uniformly emit light at the rear of the display panel 610.

To provide a 3D image 650 to the user through the optical layer 640, the PGU 630 generates a panel image 660 displayed on the display panel 610 based on positions of both eyes of the user. The PGU 630 may include at least one processor.

Figure 7C:
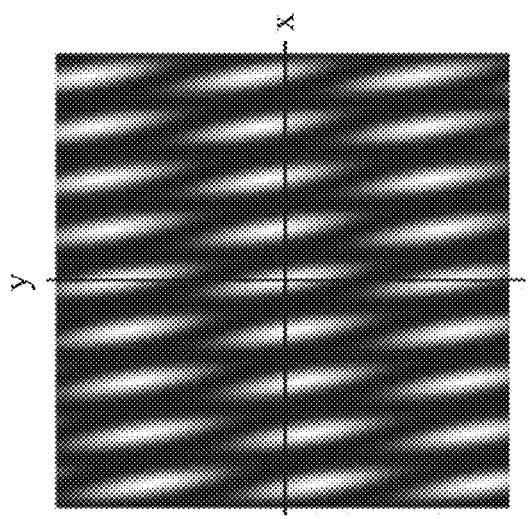
FIGS. 7A, 7B, and 7C illustrate an occurrence reason of moiré to be solved according to an example embodiment.
Figure 7C:
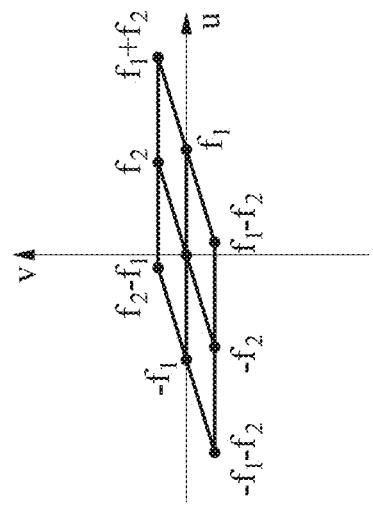
Figure 7B:
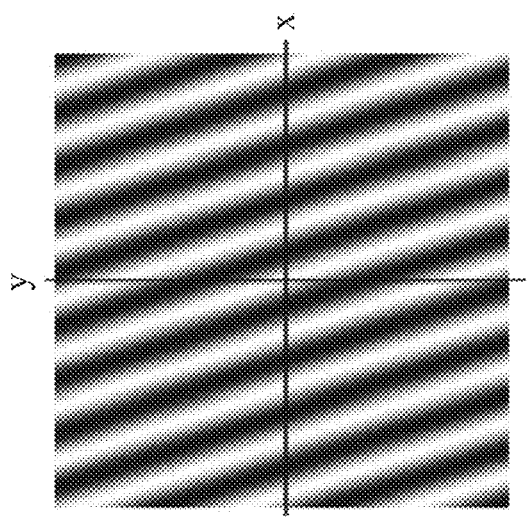
Figure 7B:
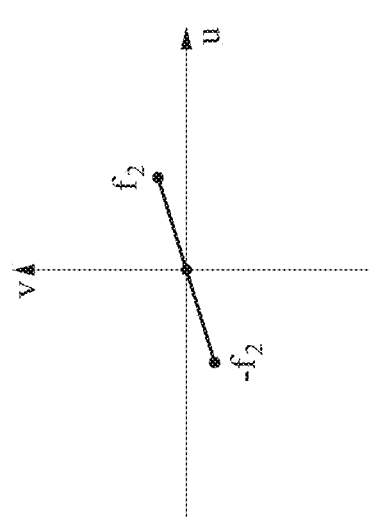
Figure 7A:
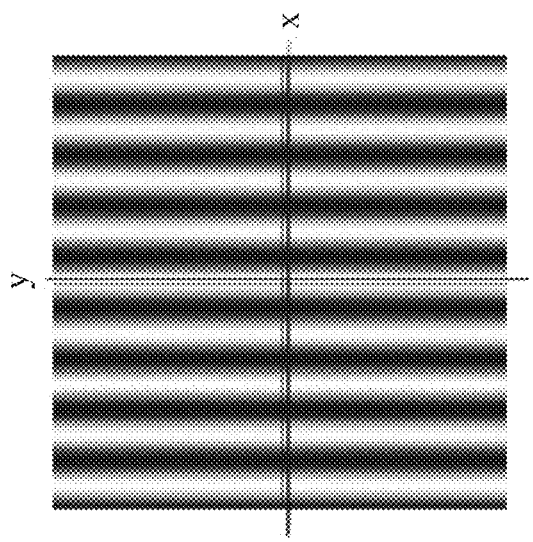
Figure 7A:
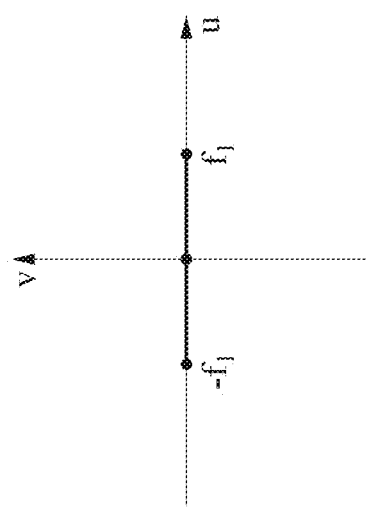

FIGS. 7A, 7B, and 7C illustrate related examples of describing an occurrence reason of moiré to be solved according to an example embodiment. FIG. 7A illustrates an example of representing an image displayed on a display panel in a space domain and FIG. 7C illustrates an example of transforming the space domain of the image of FIG. 7A to a frequency domain. The overlapping of two images may be convolution of two frequency transformed images in the frequency domain.

An image of FIG. 7A may have a ±f1 vector in the frequency domain, and an image of FIG. 7B may have a ±f2 vector in the frequency domain. Here, the ±f1 vector and the ±f2 vector may represent periodic patterns of the respective images. The periodic pattern may be represented as moiré in the mage.

An image of FIG. 7C may further have an f1+f2 vector, a −f1−f2 vector, an f1−f2 vector, and an f2−f1 vector, in addition to the ±f1 vector and the ±f2 vector as convolution of the two vectors ±f1 and ±f2 in the frequency domain. The f1+f2 vector and the −f1−f2 vector may have a high frequency compared to an original image, and the f1−f2 vector and the f2−f1 vector may have a low frequency compared to the original image. Here, when the f1−f2 vector and the f2−f1 vector are present in a cognitive frequency band, a stripped pattern may appear in a direction corresponding to the f1−f2 vector and the f2−f1 vector. A frequency vector may have a direction and a magnitude. A vector direction represents a direction of the striped pattern and is well visible at eyes of a person as a frequency of moiré becomes lower. Also, the frequency vector may have an impulse indicating a brightness level of the image.

The example embodiments described herein may be implemented using hardware components, software components, and/or a combination thereof. For example, the apparatuses, methods, processing device, and components described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular, however, one skilled in the art will be appreciated that a processing device may include multiple processing elements and/or multiple types of processing elements. For example, a processing device may include multiple processors or a processor and a controller. In addition, different processing configurations are possible, such as parallel processors.

While example embodiments have been described, it will be understood by those of ordinary skill in the art that various changes in form and details may be made therein without departing from the spirit and scope as defined by the following claims.

What is claimed is:

1. A display panel comprising:
a plurality of pixels respectively comprising a plurality of sub-pixels, the plurality of sub-pixels included in each pixel of the plurality of pixels determining a shape of each pixel; and
a plurality of placement spaces provided between the plurality of pixels,
wherein the plurality of pixels are uniformly provided in the display panel based on the plurality of placement spaces, the plurality of pixels respectively having a same shape in a horizontal direction and a vertical direction, and forming a pattern repeated at an interval, and
wherein, in a frequency domain of an image obtained by the display panel, a spatial frequency corresponding to the interval of the repeated pattern formed by the plurality of pixels is outside of a cognitive frequency band that is visible to a user, the cognitive frequency band being less than 60 cycle/degree.

2. The display panel of claim 1, wherein the repeated pattern comprises at least one pixel, and
wherein a structure of subpixels included in the at least one pixel is determined based on each of the plurality of placement spaces in the display panel.

3. The display panel of claim 1, wherein a structure of subpixels included in each of the plurality of pixels is determined based on each of the plurality of placement spaces that comprise a spacer.

4. The display panel of claim 3, wherein at least one of the subpixels included in each of the plurality of pixels has a size that is different from sizes of remaining subpixels included in each of the plurality of pixels to correspond to each of the plurality of placement spaces.

5. The display panel of claim 1, wherein a structure of subpixels included in each of the plurality of pixels is determined based on a combination of shapes, sizes, and gradients of the subpixels.

6. The display panel of claim 1, wherein the interval of the repeated pattern comprises at least one of a first interval at which the repeated pattern is repeated in the horizontal direction, a second interval at which the repeated pattern is repeated in the vertical direction, and a third interval at which the repeated pattern is repeated in a direction corresponding to a combination of the horizontal direction and the vertical direction.

7. The display panel of claim 1, wherein the plurality of pixels comprise liquid crystals.

8. A third-dimensional (3D) display device comprising:
a display panel comprising a plurality of pixels and a plurality of placement spaces provided between the plurality of pixels; and
an optical layer configured to control a direction of light incident from the display panel,
wherein the plurality of pixels are uniformly provided in the display panel based on the plurality of placement spaces,
wherein the plurality of pixels respectively comprise a plurality of sub-pixels, the plurality of sub-pixels included in each pixel of the plurality of pixels determining a shape of each pixel,
wherein the plurality of pixels respectively have a same shape in a horizontal direction and a vertical direction, and form a pattern repeated at an interval, and
wherein, in a frequency domain of an image obtained by the display panel, a spatial frequency corresponding to the interval of the repeated pattern formed by the plurality of pixels is outside of a cognitive frequency band that is visible to a user, the cognitive frequency band being less than 60 cycle/degree.

9. The 3D display device of claim 8, wherein the repeated pattern comprises at least one pixel, and
wherein a structure of subpixels included in the at least one pixel is determined based on each of the plurality of placement spaces in the display panel.

10. The 3D display device of claim 8, wherein a structure of subpixels included in each of the plurality of pixels is determined based on each of the plurality of placement spaces that comprise a spacer.

11. The 3D display device of claim 10, wherein at least one of the subpixels included in each of the plurality of pixels has a size that is different from sizes of remaining subpixels included in each of the plurality of pixels to correspond to each of the plurality of placement spaces.

12. The 3D display device of claim 8, wherein a structure of subpixels included in each of the plurality of pixels is determined based on a combination of shapes, sizes, and gradients of the subpixels.

13. The 3D display device of claim 9, wherein the interval of the repeated pattern comprises at least one of a first interval at which the repeated pattern is repeated in the horizontal direction, a second interval at which the repeated pattern is repeated in the vertical direction, and a third interval at which the repeated pattern is repeated in a direction corresponding to a combination of the horizontal direction and the vertical direction.

14. A three-dimensional (3D) head-up display (HUD) device comprising:
a display panel comprising a plurality of pixels and a plurality of placement spaces provided between the plurality of pixels;
an optical layer included in a windshield of a vehicle and configured to control a direction of light incident from the display panel; and
at least one processor configured to generate a panel image that is displayed on the display panel based on positions of both eyes of a user to provide a 3D image to the user through the optical layer,
wherein the plurality of pixels are uniformly provided in the display panel based on the plurality of placement spaces,
wherein the plurality of pixels respectively comprise a plurality of sub-pixels, the plurality of sub-pixels included in each pixel of the plurality of pixels determining a shape of each pixel,
wherein the plurality of pixels respectively have a same shape in a horizontal direction and a vertical direction, and form a pattern repeated at an interval, and
wherein a spatial frequency, in a frequency domain of the panel image obtained by the display panel, corresponding to the interval of the repeated pattern of the plurality of pixels is outside of a cognitive frequency band that is visible to the user, the cognitive frequency band being less than 60 cycle/degree.

15. The 3D HUD device of claim 14, wherein the repeated pattern comprises at least one pixel, and
wherein a structure of subpixels included in the at least one pixel is determined based on each of the plurality of placement spaces in the display panel.

16. The 3D HUD device of claim 14, wherein a structure of subpixels included in each of the plurality of pixels is determined based on each of the plurality of placement spaces that comprise a spacer.

17. The 3D HUD device of claim 16, wherein at least a portion of the subpixels included in each of the plurality of pixels has a size that is different from sizes of remaining subpixels included in each of the plurality of pixels to correspond to each of the plurality of placement spaces.

18. The 3D HUD device of claim 14, wherein a structure of subpixels included in each of the plurality of pixels is determined based on a combination of shapes, sizes, and gradients of the subpixels.

19. The 3D HUD device of claim 14, wherein the interval of the repeated pattern comprises at least one of a first interval at which the repeated pattern is repeated in the horizontal direction, a second interval at which the repeated pattern is repeated in the vertical direction, and a third interval at which the repeated pattern is repeated in a direction corresponding to a combination of the horizontal direction and the vertical direction.

20. A display panel comprising:
a plurality of pixels;
a plurality of subpixels included in each of the plurality of pixels;
a plurality of placement spaces provided between the plurality of pixels,
wherein the plurality of pixels are uniformly provided in the display panel based on the plurality of placement spaces,
wherein the plurality of subpixels included in each pixel of the plurality of pixels determine a shape of each pixel,
wherein the plurality of pixels respectively have a same shape in a horizontal direction and a vertical direction, and form a pattern repeated at an interval, and
wherein, in a frequency domain of an image obtained by the display panel, a spatial frequency corresponding to the interval of the repeated pattern of the plurality of pixels is outside of a cognitive frequency band that is visible to a user, the cognitive frequency band being less than 60 cycle/degree.

21. The display panel of claim 20, wherein the plurality of subpixels comprise at least a red sub-pixel, a green sub-pixel, and a blue sub-pixel, and a size, a shape, and a gradient of the red sub-pixel, the green sub-pixel, and the blue sub-pixel included in each of the plurality of pixels are same, respectively.

22. The display panel of claim 21, wherein at least one of the red sub-pixel, the green sub-pixel, and the blue sub-pixel included in each of the plurality of pixels has a size that is different from remaining subpixels included in each of the plurality of pixels based on each of the placement spaces.

23. The display panel of claim 20, wherein each of the plurality of placement spaces comprise a spacer.

* * * * *